United States Patent
Shi et al.

(10) Patent No.: US 11,613,667 B2
(45) Date of Patent: Mar. 28, 2023

(54) FLUORINATE POLYACRYLATE COATING COMPOSITION, THE PREPARATION METHOD THEREFORE AND USE THEREOF

(71) Applicant: Akzo Nobel Coatings International B.V., Arnhem (NL)

(72) Inventors: Zheng Shi, Shanghai (CN); Jianhui Wang, Shanghai (CN); Junbiao Lu, Shanghai (CN); Zhenglin Xu, Shanghai (CN); Shili Xing, Shanghai (CN)

(73) Assignee: Akzo Nobel Coatings International B.V., Amsterdam (NL)

( * ) Notice: Subject to any disclaimer, the term of this patent is extended or adjusted under 35 U.S.C. 154(b) by 120 days.

(21) Appl. No.: 16/955,685

(22) PCT Filed: Dec. 21, 2018

(86) PCT No.: PCT/EP2018/086524
§ 371 (c)(1),
(2) Date: Jun. 18, 2020

(87) PCT Pub. No.: WO2019/129692
PCT Pub. Date: Jul. 4, 2019

(65) Prior Publication Data
US 2020/0317950 A1    Oct. 8, 2020

(30) Foreign Application Priority Data

Dec. 26, 2017    (WO) ............... PCT/CN2017/118496

(51) Int. Cl.
*C09D 133/08* (2006.01)
*C08F 2/04* (2006.01)
*C09D 133/14* (2006.01)

(52) U.S. Cl.
CPC .............. *C09D 133/08* (2013.01); *C08F 2/04* (2013.01); *C09D 133/14* (2013.01)

(58) Field of Classification Search
CPC ........ C09D 133/08; C09D 133/14; C08F 2/04
See application file for complete search history.

(56) References Cited

U.S. PATENT DOCUMENTS

| 6,376,572 B1 | 4/2002 | Turri |
| 8,552,083 B1 | 10/2013 | Taranekar et al. |

(Continued)

FOREIGN PATENT DOCUMENTS

| CN | 101367922 | 2/2009 |
| CN | 103980215 | 8/2014 |

(Continued)

OTHER PUBLICATIONS

Lin et al. "UV-curable low-surface-energy fluorinated poly(urethane-acrylate)s for biomedical applications" European Polymer Journal 44 (2008) 2927-2937.*

(Continued)

*Primary Examiner* — Robert S Walters, Jr.
(74) *Attorney, Agent, or Firm* — Pauly, DeVries Smith & Deffner LLC

(57) ABSTRACT

The embodiments herein relate to a composition of a fluorinated polyurethane acrylate resin and a polyurethane acrylate resin, which, upon curing, is durable and has anti-stain and anti-scratch properties. The preparation of the composition is conducted with a one-pot multicomponent synthesis process, wherein multiple components are put together to carry out reactions simultaneously. The process is especially suitable for industrial scale production, and open for adding additive components to further adjust the performance of the prepared composition. The embodiments herein also relate to oligomers prepared in the synthesis process, as well as the use of the composition or oligomer to form a coating onto a substrate.

11 Claims, 5 Drawing Sheets

(a) UV resin    (b) fluorinated UV resin    (c) fluorinated UV resin scratched by steel wool

(56) References Cited

U.S. PATENT DOCUMENTS

| | | |
|---|---|---|
| 2003/0139540 A1 | 7/2003 | Turri et al. |
| 2011/0118405 A1 | 5/2011 | Suzuki et al. |
| 2013/0084458 A1 | 4/2013 | Yamada et al. |
| 2014/0287242 A1 | 9/2014 | Cleymans et al. |
| 2015/0240085 A1 | 8/2015 | Klein et al. |
| 2016/0304743 A1 | 10/2016 | Nii et al. |

FOREIGN PATENT DOCUMENTS

| | | |
|---|---|---|
| EP | 1559733 | 8/2005 |
| EP | 2412773 | 2/2012 |
| GB | 2050396 | 1/1981 |
| JP | 2009256597 | 11/2009 |
| JP | 2009256598 | 11/2009 |
| JP | 2012241060 | 12/2012 |
| WO | 9623828 | 8/1996 |
| WO | 03072625 | 9/2003 |
| WO | 2007121110 | 10/2007 |
| WO | 2014053268 | 4/2014 |
| WO | 2015038454 | 3/2015 |
| WO | 2019129692 | 7/2019 |

OTHER PUBLICATIONS

Canak et al. "Synthesis of fluorinated urethane acrylate based UV-curable coatings" Progress in Organic Coatings 76 (2013) 388-399.*

"International Preliminary Report on Patentability," for PCT Application No. PCT/EP2018/086524 dated Nov. 12, 2019 (31 pages).

"International Search Report and Written Opinion," for PCT Application No. PCT/EP2018/086524 dated Feb. 1, 2019 (13 pages).

* cited by examiner

| (a) UV resin | (b) fluorinated UV resin | (c) fluorinated UV resin scratched by steel wool |

FLUORINATE POLYACRYLATE COATING COMPOSITION, THE PREPARATION METHOD THEREFORE AND USE THEREOF

CROSS REFERENCE TO RELATED APPLICATION(S)

This application is a national stage application under 35 U.S.C. 371 of International Patent Application Serial No. PCT/EP2018/086524, entitled "FLUORINATE POLYACRYLATE COATING COMPOSITION, THE PREPARATION METHOD THEREFORE AND USE THEREOF," filed Dec. 21, 2018, which claims priority from CN2017/118496, filed on Dec. 26, 2017, the disclosures of which are hereby incorporated by reference herein in their entirety."

FIELD OF THE TECHNOLOGY

The embodiments herein relate to a coating composition for preparing a durable, stain-resistant, and scratch-resistant coating. The coating composition comprises a fluorinated polyurethane acrylate resin (FPUA) and a polyurethane acrylate resin (PUA) that are curable with ultraviolet (UV) light radiation. The embodiments herein further relate to a method for preparing the coating composition, and the use thereof.

BACKGROUND

With the rapid development of coatings technology in the industry, there have been increasingly requirements for satisfying performances of coatings, such as durability, stain resistance, scratch resistance, etc., especially for those used on plastic, metal, wood, and glass substrates. Electronic apparatus like cell phones, personal and industrial computers, digital assistants, cameras, automotive upholstery, etc., have been widely used in the modern society. Besides enjoying the appliance functions of electronic apparatuses, people wish to keep the surface of electronic apparatuses clean and resistant to abrasion and scratching.

There have been a lot of literatures and patents discussing approaches to improve anti-stain, anti-fouling or anti-fingerprint properties of coatings. As mentioned by most of these references, hydrophobic and oleophobic characteristics of a coating surface play important roles in preventing stains, fingerprints and other fouling substance from being adhered on the surface, and make it easy to clean them off by wiping. As such, fluorinated resins and additives have been widely used in various coating formulations to decrease the surface energy, and thus to improve the anti-stain performance of the resulting coating. For instance, due to the low surface energy, perfluoropolyethers (PFPEs) have been used in many resin synthesis processes as an important component. It has also been reported in references that low surface energy of a resin component helps to improve the levelling effect of the resulting coating surface.

However, there have been challenges for the application of fluorinated resins in coating formulations, especially for the application of PFPE components in coating formulations and relevant resin synthesis processes. Fluorine-based compounds are known to be incompatible with most common resins, which makes it hard to formulate a stable coating formulation with both fluorine-based compounds and other common resins. Moreover, when PFPEs are used in coating formulations, because of the low glass transition temperature of PFPEs, the resulting coating surface and coating matrix tend to be soft, and thus lead to decreased anti-scratch performance of the resulting coatings. Although existing patents and literatures have mentioned the use of fluorinated resins or PFPEs to improve anti-stain, anti-fingerprint, silky feeling and other properties of a coating or to form a hard coating with abrasion resistance, the applicable substrates are still limited, and there still exist limitations of the resulting anti-stain and anti-scratch properties. In general, the properties achieved according to the state of the art are not satisfying enough in view of the rapidly developing industrial criteria.

WO 2015/038454 disclosed a poly fluorine-containing silicone coating for use on glass substrates, wherein a PFPE was added into a coating formulation to improve the lubricating performance and colloidal silica was added into the formulation to improve the anti-scratch performance.

WO 2007/121110 disclosed a coating for use on a flooring substrate, comprising a PFPE component to provide the flooring substrate with repellence properties such as water, oil or stain repellence. It is mentioned that the reaction only took place at one end of the molecule chain of the PFPE.

US 2013/0084458 disclosed a hard coat agent composition comprising a urethane acrylate, a first fluorine-containing polyether compound having active energy ray reactive group via a urethane bond at each of both ends of molecular chain containing a PFPE group, a second fluorine-containing polyether compound having active energy ray reactive group via a urethane bond at one end of molecular chain containing a PFPE group. The hard coat film is excellent in transparency, anti-stain, lubricating, solvent resistance, scratch resistance and abrasion resistance, as well as in punchability.

JP 2009256597 disclosed a urethane acrylate resin containing a PFPE group capable of imparting excellent transparency and anti-fouling properties to the cured film. The reaction product of a diol compound having a perfluoropolyether structure and an aromatic diisocyanate compound, obtained by reacting a compound having a hydroxyl group and 5 or more (meth) acryloyl group, perfluoropolyether compounds having groups, urethane groups and 10 or more (meth) acryloyl group.

US 2011/118405 A1 describes an active-energy-ray-curable coating composition containing a radical-polymerizable resin (I) containing a polymer structure ($\alpha$) of a radical-polymerizable unsaturated monomer and a poly(perfluoroalkylene ether) chain ($\beta$), and having a resin structure in which a plurality of the polymer structures ($\alpha$) are linked to each other with the poly (perfluoroalkylene ether) chain ($\beta$) therebetween and the polymer structures ($\alpha$) each have a radical-polymerizable unsaturated group at a side chain thereof; and a polymerization initiator (II).

U.S. Pat. No. 8,552,083 B1 describes a radiation-curable composition having a refractive index less than 1.40 comprising (1) a curable perfluoropolyether oligomer with a particular formula, (2) a diluent, (3) a photo-initiator, and (4) an adhesion promoter, wherein the radiation-curable composition is free of compounds containing —$CF_3$ groups.

U.S. Pat. No. 6,376,572 B1 describes the use of a composition for preparing by radical route polymeric films having refractive index lower than 1.400, said composition comprising a) a perfluoropolyether of a specified formula, b) from 0.1 to 10% by weight of a perfluoropolyether of another specified formula, c) from 0 to 30 wt. % by weight of compounds selected from c1) compounds not containing fluorine: non fluorinated (meth)acrylic esters or vinyl monomers; or c2) compounds containing fluorine: mono(meth) acrylate perfluoropolyethers or perfluoroalkyl mono (meth) acrylates, d) from 0.01 to 10% by weight of a photoinitiator and/or radical initiators.

With the development of coatings technology, however, there have been increasingly the demands for durability, scratch resistance and stain resistance properties of resulting coatings. It is still challenging in the prior art when a coating is required to have above mentioned properties.

SUMMARY

In an embodiment, a coating composition is included having (a) a polyacrylate oligomer of the following structure (I)

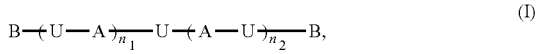

and (b) a fluorinated polyacrylate oligomer of the following structure (II)

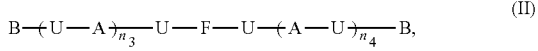

wherein, U represents an isocyanate structure that had at least two —N=C=O functional groups before the reaction; A represents a diol or polyol structure before the reaction; F represents a fluorinated diol or polyol structure, or a perfluoropolyether structure that contained at least two hydroxyl groups before the reaction, or a mixture thereof; B represents a monomer structure that had at least one double bond and at least one hydroxyl group before the reaction; $n_1$, $n_2$, $n_3$ and $n_4$ are integers, the sum of $n_1$ and $n_2$ is ranging from 0 to 20, the sum of $n_3$ and $n_4$ is ranging from 1 to 20.

In an embodiment, wherein the weight ratio between the oligomers (I) and (II) is from 100:0.01 to 0:100.

In an embodiment, a coating composition can include the following oligomers (III) and (IV)

wherein, U represents an isocyanate structure that had at least two —N=C=O functional groups before the reaction; $U_1$ represents a trimer of a bifunctional isocyanate structure before the reaction; A represents a diol or polyol structure before the reaction; F represents a fluorinated diol or polyol structure, or a perfluoropolyether structure that contains at least two hydroxyl groups before the reaction, or a mixture thereof; B represents a monomer structure that had at least one double bond and at least one hydroxyl group before the reaction; $n_5$, $n_6$, $n_7$, $n_8$, $n_9$ and $n_{10}$ are integers, the sum of $n_5$, $n_6$, and $n_7$ is ranging from 0 to 20, the sum of $n_8$, $n_9$ and $n_{10}$ is ranging from 0 to 20.

In an embodiment, wherein the weight ratio between the oligomers (III) and (IV) is from 100:0.01 to 0:100.

In an embodiment, wherein U originates from a diisocyanate structure selected from the group consisting of 1,6-hexane diisocyanate, isophoron diisocyanate, 4,4'-diphenylmethane-diisocyanate, 4,4'-dicyclohexylmethane diisocyanate, xylylene diisocyanate, tolylene-2,4-diisocyanate, and a mixture thereof.

In an embodiment, wherein U1 originates from a trimer of a diisocyanate structure selected from trimers of 1,6-hexane diisocyanate, isophoron diisocyanate, and a mixture thereof.

In an embodiment, wherein A originates from a diol structure or polyol structure selected from the group consisting of glycols, ethylene glycol, diethylene glycol, neopentyl glycol, 1,6-Hexanediol, cyclohexanedimethanol, polyester diols, polycarbonate diols, polyether diols, PEG200, PEG400, PEG600, PPG1000, and a mixture thereof.

In an embodiment, wherein B originates from a hydroxyl (meth)acrylate structure that contains at least one (meth) acryloyl group and one hydroxyl group, selected from the group consisting of 2-hydroxyethyl(meth)acrylate, 2-hydroxypropyl(meth)acrylate, 2-hydroxybutyl(meth)acrylate, 1-hydroxybutyl(meth)acrylate, neopentylglycolmono(meth) acrylate, 1,6-hexanediolmono(meth)acrylate, polycarprolactone polyol mono(meth)acrylate, pentaerythritolpenta(meth) acrylate, dipentaerythritolpenta(meth)acrylate, and a mixture thereof.

In an embodiment, wherein F is selected from the group can include of:
2,2,3,3-tetrafluoro-1,4-butanediol;
2,2,3,3,4,4,5,5-octafluoro-1,6-hexanediol;
2,2,3,3,4,4,5,5,6,6,7,7-dodecafluoro-1,8-octanediol;
2,2,3,3,4,4,5,5,6,6,7,7,8,8-tetradecafluoro-1,9-nonanediol;
2,2,3,3,4,4,5,5,6,6,7,7,8,8,9,9-hexadecafluoro-1,10-decanediol; and
1H,1H,12H,12H-Perfluoro-1,12-dodecanediol.

In an embodiment, wherein F is selected from the group consisting of: HO(CH2CH2O)nCH2CF2O(CF2CF2O)p (CF2O)qCF2CH2(OCH2CH2)nOH; HOCH2CF2O (CF2CF2O)p(CF2O)qCF2CH2OH; HOH2C(CF3)FC(CF (CF3)CF2O)nCF(CF3)CH2OH; HOH2C(CF3)CF (CF2CF2O)nCF(CF3)CH2OH HOH2CCF2(CF2CF2O) nCF2CH2OH; HOH2CF2C(CF2CF2OCF2CF2CF2O) nCF2CH2OH; HOH2CCH2CF2O(CF2CF2O)m(CF2O) nCF2CH2CH2OH; wherein m is from 1 to 50, n is from 1 to 50, p is from 1~5, q is from 1~5.

In an embodiment, a method for preparing a coating composition can include steps of: a) preparing a solution of a fluorinated diol or polyol, a perfluoropolyether that contains at least two hydroxyl groups, or a mixture thereof in a solvent, b) dropping the solution of step a) into an isocyanate that has at least two isocyanate functional groups, with maintaining the temperature at 50 to 60° C. for 1 to 2 hours, c) adding a diol or polyol into the mixture of step b), with maintaining the temperature at 50 to 60° C. for 1 to 2 hours, d) adding a monomer that has at least one double bond and at least one hydroxyl group into the mixture of step c), with maintaining the temperature at 80 to 90° C. for 1 to 2 hours.

In an embodiment, a method for preparing the coating composition can include steps of: a) mixing a monomer that has at least one double bond and at least one hydroxyl group with an isocyanate that has at least two isocyanate functional groups, with maintaining the temperature at 50 to 60° C. for 1 to 2 hours, b) adding into the mixture of step a) a diol or polyol, with maintaining the temperature at 50 to 60° C. for 1 to 2 hours, c) preparing a solution of a fluorinated diol or polyol, a perfluoropolyether that contains at least two hydroxyl groups, or a mixture thereof in a solvent, d) dropping the solution of step c) into an isocyanate which is trimer of a diisocyanate, with maintaining the temperature at 50 to 60° C. for 1 to 2 hours, e) adding the mixture of step b) into the mixture of step d), with maintaining the temperature at 80 to 90° C. for 1 to 2 hours.

In an embodiment, a method of using the coating composition or oligomer to form a coating film onto a substrate can include applying and then curing the coating composition or oligomer on the substrate.

The present embodiments herein provide for a fluorinated resin composition, which, upon curing, is durable and has anti-stain and anti-scratch properties. The composition comprises an oligomer prepared from an isocyanate, a diol or polyol, and a monomer that has at least one double bond and at least one hydroxyl group, and another oligomer prepared from an isocyanate, a diol or polyol, a fluorinated diol or polyol or a perfluoropolyether containing at least two hydroxyl groups, and a monomer that has at least one double bond and at least one hydroxyl group.

The preparation of the fluorinated resin composition is conducted with a one-pot multicomponent synthesis process, wherein multiple components are put together to carry out reactions simultaneously. The process is especially suitable for industrial scale production, and open for adding additive components to further adjust the performance of the prepared composition.

The embodiments herein also provides for the relevant oligomers prepared in the synthesis process, as well as the use of said composition or oligomer to form a coating onto a substrate.

DETAILED DESCRIPTION

In one aspect of the embodiments herein, a coating composition is provided. The coating composition comprises at least two oligomers, wherein the first oligomer is prepared from an isocyanate, a diol or polyol, and a monomer that has at least one double bond and at least one hydroxyl group. The second oligomer is prepared from an isocyanate, a diol or polyol, a fluorinated diol or polyol or a perfluoropolyether containing at least two hydroxyl groups, and a monomer that has at least one double bond and at least one hydroxyl group.

Specifically, the coating composition of the embodiments herein comprises:

a first polyacrylate oligomer of the following structure (I)

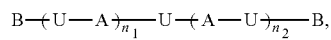
(I)

and a second fluorinated polyacrylate oligomer of the following structure (II)

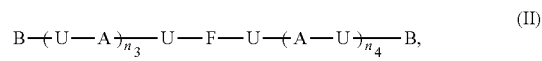
(II)

wherein,

U represents an isocyanate structure that had at least two —N=C=O functional groups before the reaction; A represents a diol or polyol structure before the reaction; F represents a fluorinated diol or polyol structure or a perfluoropolyether structure that contained at least two hydroxyl groups before the reaction, or a mixture thereof; B represents a monomer structure that had at least one double bond and at least one hydroxyl group before the reaction, $n_1$, $n_2$, $n_3$ and $n_4$ are integers, the sum of $n_1$ and $n_2$ is ranging from 0 to 20, the sum of $n_3$ and $n_4$ is ranging from 1 to 20. It should be noticed that the structures of (I) and (II) do not have to be symmetric necessarily. $n_1$, $n_2$, $n_3$ and $n_4$ of structures (I) and (II) may independently represent any integer within the definition that the sum of $n_1$ and $n_2$ is ranging from 0 to 20, the sum of $n_3$ and $n_4$ is ranging from 1 to 20. The weight ratio between the oligomers (I) and (II) in the composition is from 100:0.01 to 0:100, or from 90:10 to 10:90, or from 70:30 to 30:70.

In a further aspect of the embodiments herein, a coating composition comprising oligomers of the following structures (III) and (IV) is provided.

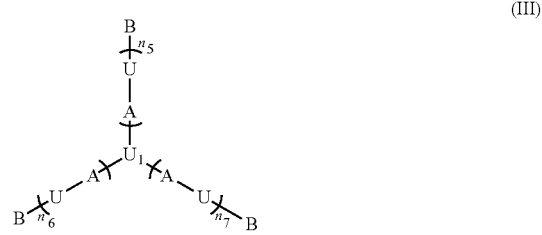
(III)

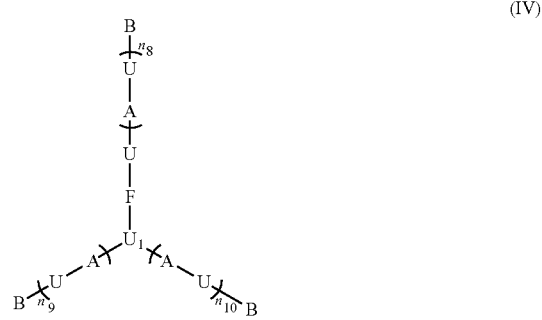
(IV)

wherein,

U represents an isocyanate structure that had at least two —N=C=O functional groups before the reaction; $U_1$ represents a trimer of a bifunctional isocyanate structure before the reaction; A represents a diol or polyol structure before the reaction; F represents fluorinated diol or polyol structure or a perfluoropolyether structure that contained at least two hydroxyl groups before the reaction; B represents a monomer structure that had at least one double bonds and at least one hydroxyl group before the reaction, $n_5$, $n_6$, $n_7$, $n_8$, $n_9$ and $n_{10}$ are integers, the sum of $n_5$, $n_6$, and $n_7$ is ranging from 0 to 20, the sum of $n_8$, $n_9$ and $n_{10}$ is ranging from 0 to 20. The weight ratio between the oligomers (III) and (IV) in the composition is from 100:0.01 to 0:100, or from 90:10 to 10:90, or from 70:30 to 30:70.

Although the composition of the embodiments herein is prepared through a one-pot multicomponent synthesis process, and the obtained mixture of oligomers can be used in coating formulations directly, it is possible in some cases that the oligomers are isolated and provided in the form of a pure component, which can be further added into coating formulations, acting as either a main resin component, or an additive component.

It has been found that the double bond density of the monomer B structure may affect anti-stain and anti-scratch properties of the resulting coating. Specifically, for example, the double bond functionality of the monomer B structure is at least 1, or 3 or 5, or 5, so as to achieve satisfying anti-stain and anti-scratch properties of the resulting coating.

It has also been found that rigid and soft molecules may be introduced into the oligomers of the embodiments herein during the synthesis process. Generally, rigid molecules may be added to increase the hardness and durability of the resulting coating film, soft molecules may be added to increase the flexibility and elasticity of the coating film, and therefore increase the self-recovery performance of the resulting coating film. When used herein in the embodiments herein, the term "rigid" is meant to be the characteristic of a molecule, with which, the molecule does not tend to bend or flex when receiving a force, and on the contrary, the term "soft" is meant to be the characteristic of a molecule, with which, the molecule tends to bend or flex when receiving a force. A skilled person would understand that there is no clear boundary between "rigid" and "soft." If introducing a molecule into the oligomers of the embodiments herein leads to more "rigid" characteristic, the molecule is considered as a "rigid molecule," and vice versa. Typically, for example, rigid molecules suitable for use in the embodiments herein can be selected from polyols that have a relatively low glass transmission temperature (Tg) value or diols that have a relatively long carbon chain structure; soft molecules suitable for use in the embodiments herein can be selected from polyols that have relatively high Tg or diols that have a ring structure. A skilled person may select proper molecules by setting up standards of Tg values, chain length, etc., as per actual requirements.

The isocyanate U structure that is suitable for the embodiments herein is selected from, but not limited to the group consisting of 1,6-hexane diisocyanate (HDI), isophoron diisocyanate (IPDI), 4,4'-diphenyl-methane-diisocyanate (MDI), 4,4'-dicyclohexylmethane diisocyanate (HMDI), xylylene diisocyanate (XDI), Tolylene-2,4-diisocyanate (TDI), and a mixture thereof;

The trimer $U_1$ structure that is suitable for the embodiments herein is selected from, but not limited to trimers of 1,6-hexane diisocyanate (HDI), isophoron diisocyanate (IPDI), and a mixture thereof.

The diol or polyol A structure that is suitable for the embodiments herein is selected from, but not limited to the group consisting of glycols, ethylene glycol, diethylene glycol, neopentyl glycol, 1,6-hexanediol, cyclohexanedimethanol, polyester diols, polycarbonate diols, polyether diols, PEG200, PEG400, PEG600, PPG1000, etc., and a mixture thereof.

The monomer B structure that is suitable for the embodiments herein is selected from, but not limited to the group consisting of 2-hydroxyethyl(meth)acrylate, 2-hydroxypropyl(meth)acrylate, 2-hydroxybutyl(meth)acrylate, 1-hydroxybutyl(meth)acrylate, neopentylglycolmono(meth)acrylate, 1,6-hexanediolmono(meth)acrylate, polycarprolactone polyol mono(meth)acrylate, pentaerythritolpenta(meth)acrylate, dipentaerythritolpenta(meth)acrylate and a mixture thereof.

The perfluoropolyether structure useful in the embodiments herein is a fluorine-containing polyether structure having at least two hydroxyl groups at each end of its molecule chain. The fluorine-containing polyether structure may be in the form of either straight chain or branched chain, for example, having structures of —[CF2O]—, —[CF$_2$CF$_2$O]—, —[CF$_2$CF$_2$CF$_2$O]—, —[CF(CF$_3$)CF$_2$O]—, or the likes. The perfluoropolyether group may contain one or more types of perfluoropolyether units. The fluoropolyether units may be arranged in random or block form when there are two or more perfluoropolyether units in the perfluoropolyether chain.

Specifically, perfluoropolyether that is suitable for use in the embodiments herein is selected from, but not limited to:

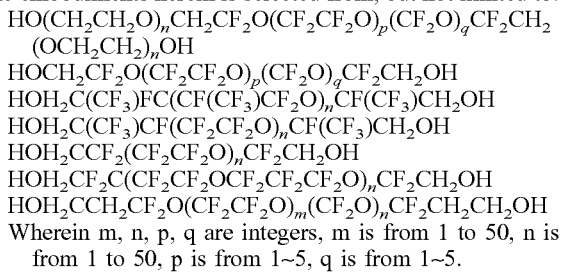

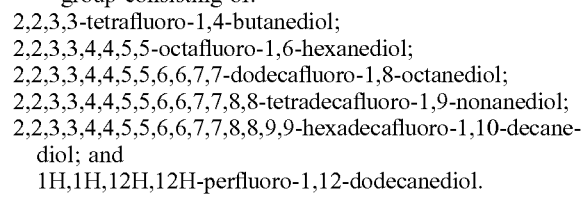

Wherein m, n, p, q are integers, m is from 1 to 50, n is from 1 to 50, p is from 1~5, q is from 1~5.

Fluorinated diol or polyol that is suitable for the embodiments herein is selected from, but not limited to diols having the structure OHCH$_2$(CF$_2$)$_r$CH$_2$OH, wherein r is from 2 to 10. For example, they are selected from the group consisting of:

2,2,3,3-tetrafluoro-1,4-butanediol;
2,2,3,3,4,4,5,5-octafluoro-1,6-hexanediol;
2,2,3,3,4,4,5,5,6,6,7,7-dodecafluoro-1,8-octanediol;
2,2,3,3,4,4,5,5,6,6,7,7,8,8-tetradecafluoro-1,9-nonanediol;
2,2,3,3,4,4,5,5,6,6,7,7,8,8,9,9-hexadecafluoro-1,10-decanediol; and
1H,1H,12H,12H-perfluoro-1,12-dodecanediol.

In another aspect, methods for preparing coating compositions according to the embodiments herein are provided.

The resin composition according to the embodiments herein is generally prepared from a fluorinated diol or polyol and/or a perfluoropolyether with at least two hydroxyl groups at the ends of its molecule chain (hereinafter referred to as "fluorinated compound (F)"), an isocyanate (U) that has at least two isocyanate functional groups (hereinafter referred to as "isocyanate (U)"), a diol or polyol (A) that has at least two hydroxyl functional groups (hereinafter referred to as "diol or polyol (A)"), and a monomer (B) that has at least one double bond and at least one hydroxyl group (hereinafter referred to as "monomer (B)"). The preparation is conducted within a one-pot multicomponent synthesis system, wherein fluorinated polyurethane acrylate resin (FPUA) and polyurethane acrylate resin (PUA) are formed simultaneously from fluorinated compound (F), isocyanate (U), and diol or polyol (A), and then further reacted with monomer (B) for end-capping. As the multiple reactions are all carried out in a one-pot multicomponent system, the method is especially suitable for industrial scale practice, and also flexible for adding additive components to further adjust the performance of the prepared composition.

It should be noticed that, due to the one-pot multicomponent synthesis process, the obtained product normally presents as a mixture of oligomers, which can be used to formulate a coating composition directly. As discussed above, this is an advantage of the present process in terms of industrial scale production and applications. In some scenarios, however, it is also possible to isolate one or more of the oligomers from the product of the present process, to provide it (them) as pure resin component(s) for addition into coating formulations. Technology for isolation of the oligomers is well known in the art, thus it will not be discussed in detail in the embodiments herein.

Specifically, the isocyanate (U) reacts with the fluorinated compound (F) which is a fluorinated diol or a polyol to form a structure of -U-F-U-.

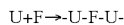

The obtained structure of -U-F-U-, together with unreacted isocyanate -U-, reacts with the diol or polyol (A) to form structures of $-(U-A)_{n3}-U-F-U-(A-U)_{n4}-$ and $-(U-A)_{n1}-U-(A-U)_{n2}-$;

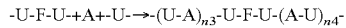

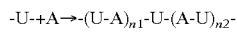

The obtained structures of $-(U-A)_{n3}-U-F-U-(A-U)_{n4}-$ and $-(U-A)_{n1}-U-(A-U)_{n2}-$ further react with the monomer (B) to form a composition of $B-(U-A)_{n3}-U-F-U-(A-U)_{n4}-B$ and $B-(U-A)_{n1}-U-(A-U)_{n2}-B$, respectively, to end-cap the structures.

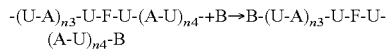

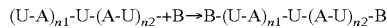

The above reactions may be conducted as the steps below:

a) preparing a solution of a fluorinated diol or a perfluoropolyether that contains at least two hydroxyl groups in a solvent;

b) dropping the solution of step a) into an isocyanate that has at least two isocyanate functional groups, with maintaining the temperature at 50 to 60° C. for 1 to 2 hours, or at 60° C. for 2 hours;

c) adding a diol that has at least two hydroxyl functional groups into the mixture of step b), with maintaining the temperature at 50 to 60° C. for 1 to 2 hours, or at 60° C. for 2 hours, to result in a proper chain extension through the formation of urethane bonds between (U) and (A);

d) adding a monomer that has at least one double bond and at least one hydroxyl group into the mixture of step c), with maintaining the temperature at 80 to 90° C. for 1 to 2 hours, or at 90° C. for 2 hours.

By selecting isocyanates that have different reaction selectivity with hydroxyl functional groups, or controlling reaction conditions such as, for example, the speed of adding the reaction components, the reaction temperature, the catalyst and the amount thereof, the ways of adding catalyst, etc., the prepared structures (I) and (II) according to the embodiments herein don't have to be symmetric necessarily. As defined above, each of $n_1$, $n_2$, $n_3$ and $n_4$ in structures (I) and (II) may independently represent any integer within the definition that the sum of $n_1$ and $n_2$ is ranging from 0 to 20, the sum of $n_3$ and $n_4$ is ranging from 1 to 20. The ratio between the oligomers I and II in the composition is from 100:0.01 to 0:100.

It has been found that the ratio among the reaction components may affect the hardness and durability of the resulting coating film, therefore it is possible to increase anti-stain and anti-scratch properties of the resulting coating film, by fine tuning the ratio among the reaction components. As a demonstration of means to adjust the ratio among compositions, but not for the purpose to limit the scope of the embodiments herein, fluorinated compound (F) is added with a predetermined weight percentage such as 2 wt. ‰, the other components are then further mixed into the composition according to a predetermined proportion relative to the amount of fluorinated compound (F). One of ordinary skill in the art may select proper relative proportions to achieve necessary characteristics of the composition such as the polymer length, the average number molecule weight, the number of repeat units in the molecule chain, etc. For instance, by selecting proper relative proportions of the components, the average number molecular weight and chain length of the oligomers can be varied from hundreds to thousands, or even more by changing the molar ratio between isocyanate and diols or polyols, or type of diols or polyols.

According to the embodiments herein, the inventors designed soft and rigid structures for PUA oligomers by introducing into the oligomers soft and rigid molecules respectively in the synthesis process, to form a structure as below:

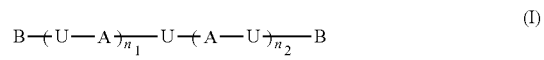

(I)

FPUA oligomers are modified in a similar way. The fluorinated diol or polyol or perfluoropolyether for use in the embodiments herein contains at least two hydroxyl groups at its chain ends. The hydroxyl groups may react with isocyanate, and thus make it possible for other chemical groups to be imbedded into the structure. The resulting structure is shown below.

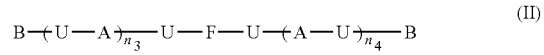

(II)

Besides the linear chain structures based on dimers as shown above, the oligomers of the coating composition of the embodiments herein may also be prepared as branched structures based on trimers, as shown in the following structures (III) and (IV).

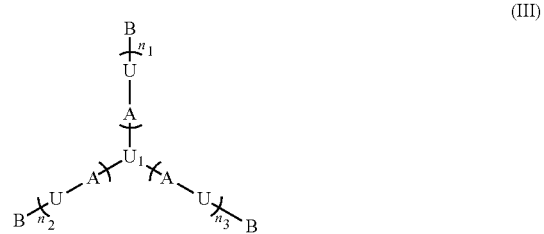

(III)

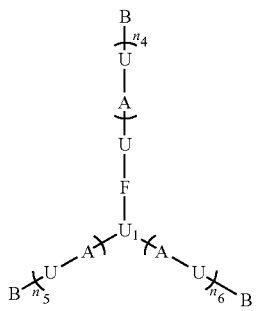

(IV)

According to the embodiments herein, $U_1$ refers to an isocyanate trimer such as HDI trimer, IPDI trimer, etc.; The other components A, B, U, and F have the same meaning as discussed above. The reaction mechanisms are also similar to those discussed above.

To obtain the above trimer structures, method for preparing oligomers having branched structures based on trimers is provided. The method comprises steps of:
a) mixing a monomer that has at least one double bond and at least one hydroxyl group with an isocyanate that has at least two isocyanate functional groups, with maintaining the temperature at 50 to 60° C. for 1 to 2 hours, or at 60° C. for 2 hours;
b) adding into the mixture of step a) a diol that has at least two hydroxyl functional groups, with maintaining the temperature at 50 to 60° C. for 1 to 2 hours, or at 60° C. for 2 hours;
c) preparing a solution of a fluorinated diol or a perfluoropolyether that contains at least two hydroxyl groups in a solvent;
d) dropping the solution of step c) into an isocyanate which is trimer of a diisocyanate, with maintaining the temperature at 50 to 60° C. for 1 to 2 hours;
e) adding the mixture of step b) into the mixture of step d), with maintaining the temperature at 80 to 90° C. for 1 to 2 hours.

Application of the Oligomer/Composition of the Embodiments Herein

The fluorinated oligomer of the embodiments herein may be added into coating compositions to improve the anti-stain, anti-scratch properties, and levelling effect of resulting coatings by virtue of its low surface energy, high cross-linking density, and the structural possibility for embedding rigid segments. Moreover, the fluorinated oligomer may also be helpful to improve the flexibility and self-recovery properties of the resulting coatings, where soft molecules like elastic diols or poly-diols exist in the structure of the oligomers.

Oligomers of the embodiments herein may be used as a resin component singularly, or together with other resins and/or monomers in a coating formulation. The oligomers of the embodiments herein are compatible with most of other resins. Due to the unsaturated double bonds contained in their structures, they are curable with ultraviolet light. Therefore, the oligomers and compositions of the embodiments herein may be widely used in the coatings industry.

BRIEF DESCRIPTION OF THE FIGURES

The above and other objectives, features and advantages of the embodiments herein will become more apparent to those of ordinary skill in the art by describing the embodiments thereof with reference to the accompanying drawings.

EXAMPLES

The embodiments herein will be elucidated with reference to the following examples. These are intended to illustrate the embodiments herein but are not to be construed as limiting in any manner the scope thereof.

Raw MATERIAL

Perfluoropolyether (E-10H, Solvay), Dipentaerythritol hexaacrylate (SR399, Sartomer), Pentaerythritol acrylate (SR444D, Sartomer), Cyclohexanedimethanol (CHDM, CAS No. 105-08-8, Sigma-Aldrich), PEG600 (600PU, Clariant), Di-isocyanates (HDI and IPDI, Wanhua)) and Trimer of HDI (HT100, Wanhua).

Measurement Method and Apparatus

Number average molecular weight (Mn) and weight average molecular weight (Mw) of the resins were measured by gel permeation chromatography (GPC). GPC was conducted with a commercially available polymer weight measuring apparatus (apparatus name: Agilent 1200). GPC samples were prepared by diluting fluorinated resins with tetrahydrofuran (THF) to 0.1 wt. % and pass through 0.5 μm filter.

All FtIR spectra were obtained at a resolution of 4 cm$^{-1}$ by using PerkinElmer Spectrum 100 FTIR with ATR system. The wave-number range was selected from 4000 to 450 cm$^{-1}$ and 32 scans were averaged to reduce the noise.

For NMR testing, samples were dissolved in a mixture solvent of CDCl$_3$ and DMSO, and measured by NMR (Nuclear Magnetic Resonance) spectroscopy. The NMR data was obtained in a 400 MHz NMR system using a 5 mm probe at room temperature. The sample was measured by means of 1D (1H, 13C) and 2D (COSY, HMQC) experiment.

Example 1—Synthesis Process

HDI (30.86 g) and dibutyl tin dilaurate (0.3 g) and BHT (0.3 g) were placed into a four-neck round bottom flask that was equipped with an agitator and a condenser. Perfluoropolyether diol (0.6 g) was dissolved in methyl isobutyl ketone (MiBK) and added to the mixture and heated to 60° C. The mixture was cooked at 60° C. for 1 hour. Then cyclohexanedimethanol (CHDM) (13.23 g) was dropped into the mixture within one hour at 60° C. and the mixture was cooked at 60° C. for one hour. Finally, dipentaerythritol hexaacrylate (DPHA) (246 g) was added dropwise within 1 hour at 90° C. and the mixture was cooked at 90° C. for 1 hour or more until NCO group completely disappeared.

Figure 1:
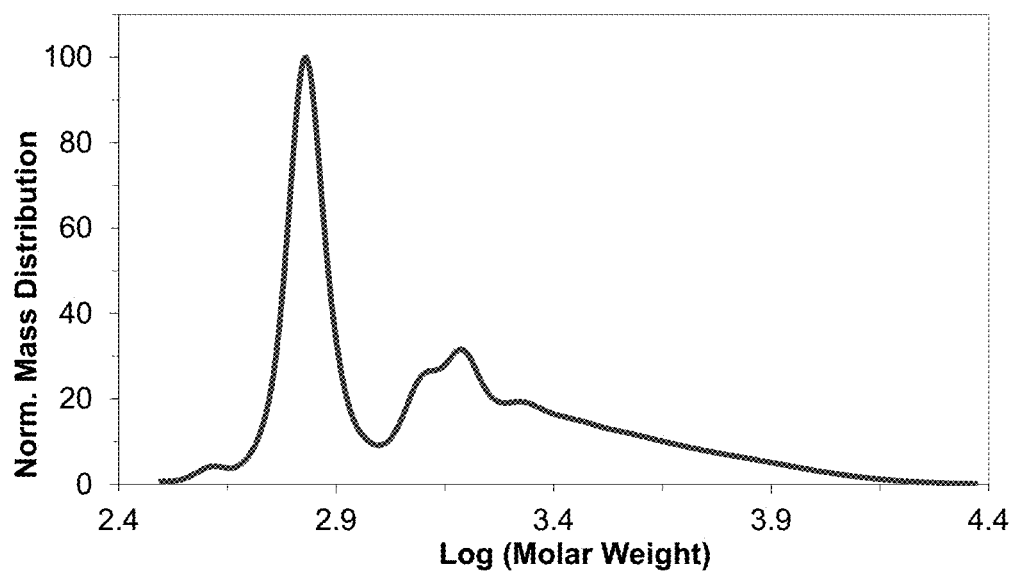
FIGS. 1, 2, and 3 show the GPC spectrum obtained according to examples 1, 2, and 3, respectively.
Figure 4:
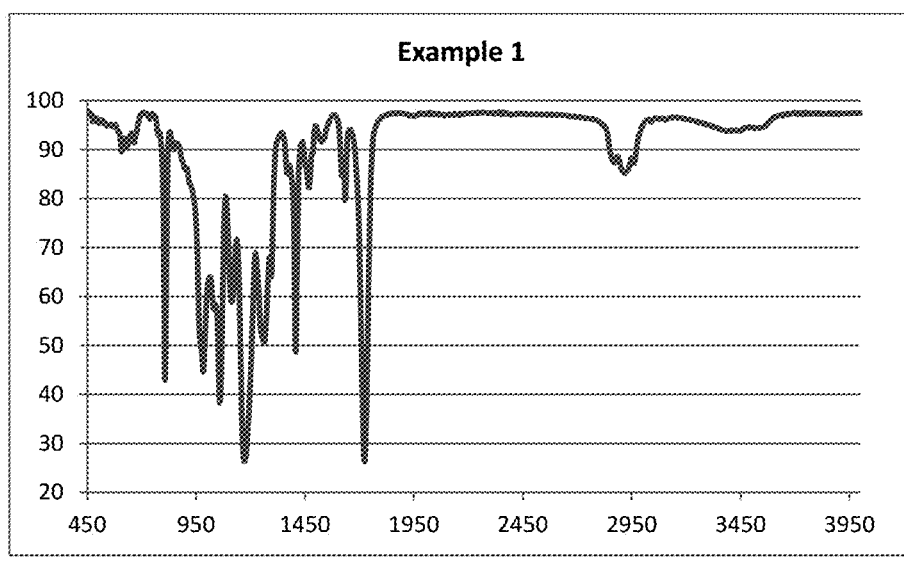
FIGS. 4, 5, and 6 show the IR spectrum obtained according to examples 1, 2, and 3, respectively.
Figure 7:
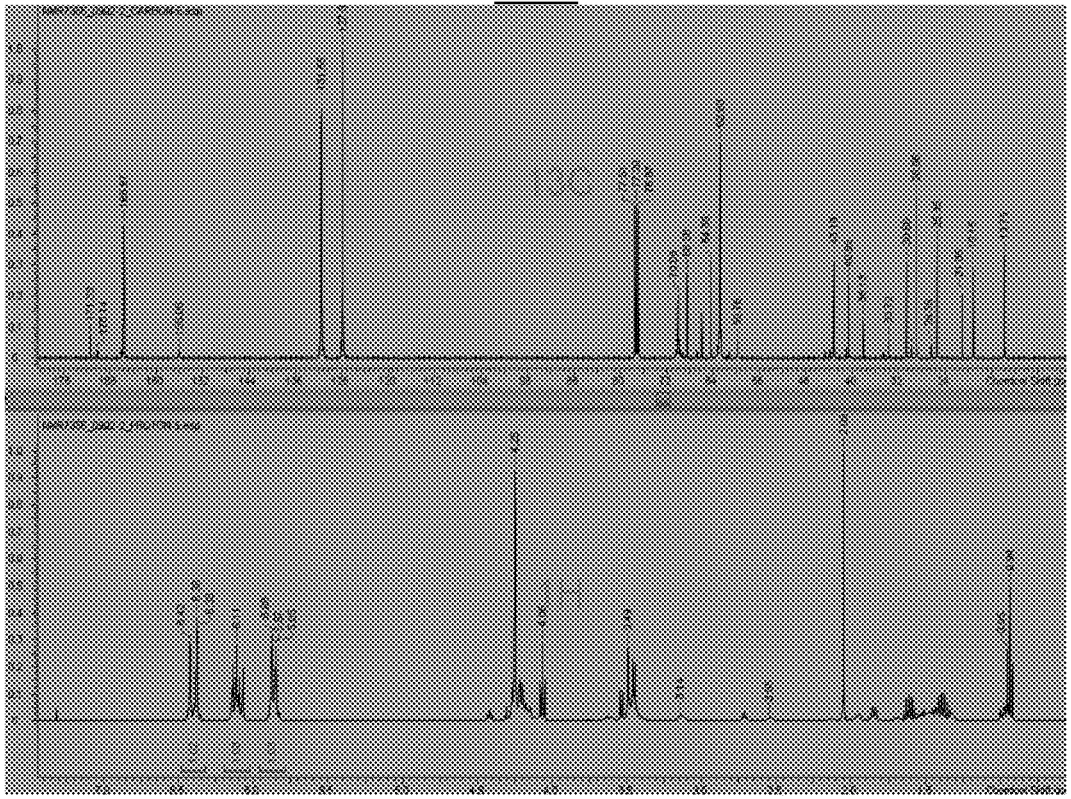
FIGS. 7, 8, and 9 show the NMR spectra obtained according to examples 1, 2, and 3, respectively.

The GPC results showed the distribution of the prepared resin, as seen in FIG. 1. The IR spectra showed the functional groups of the prepared resin, as seen in FIG. 4; The NMR spectra showed $^1$H and $^{13}$C of the prepared resin, as shown in FIG. 7.

Example 2—Synthesis Process

HDI (50.37 g) and dibutyl tin dilaurate (0.3 g) and BHT (0.3 g) were placed into a four-neck round bottom flask that was equipped with an agitator and a condenser. Perfluoropolyether diol (0.6 g) was dissolved in methyl isobutyl ketone (MiBK) and added to the mixture and heated to 60° C. The mixture was cooked at 60° C. for 1 hour. Then PEG600 (79.89 g) was dropped into the mixture within one hour at 60° C. and the mixture was cooked at 60° C. for one hour. Finally, pentaerythritol acrylate (PETA) (169.74 g) was added dropwise within 1 hour at 90° C. and the mixture was cooked at 90° C. for 1 hour or more until NCO group completely disappeared.

Figure 2:
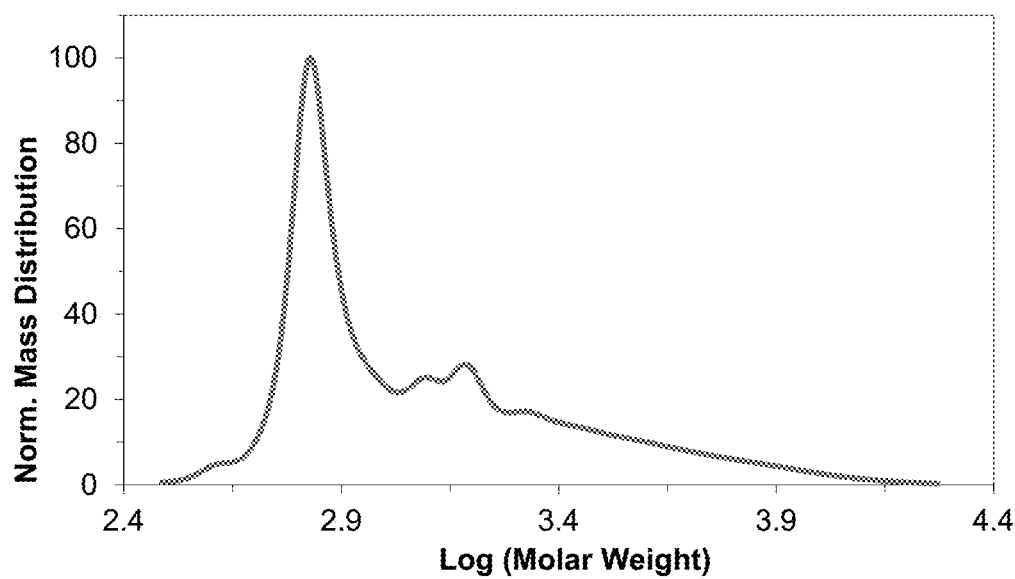
Figure 5:
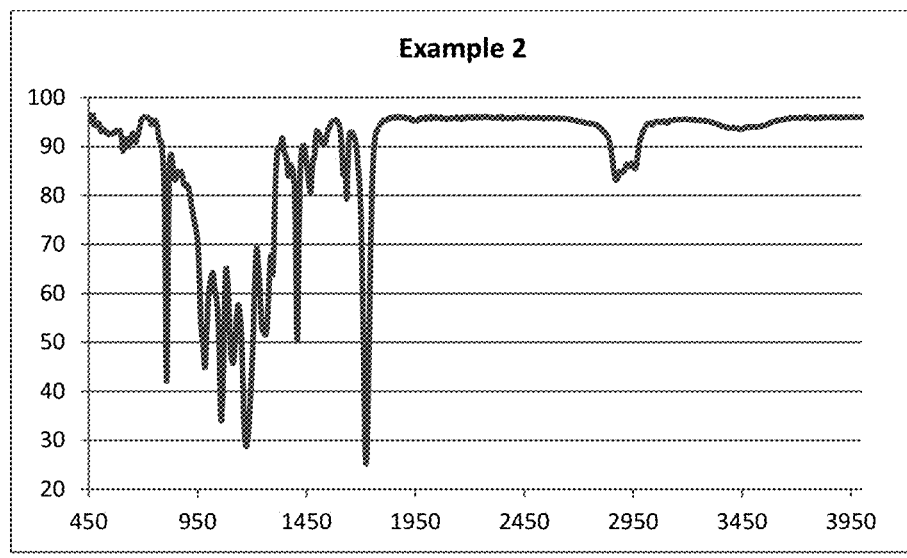
Figure 8:
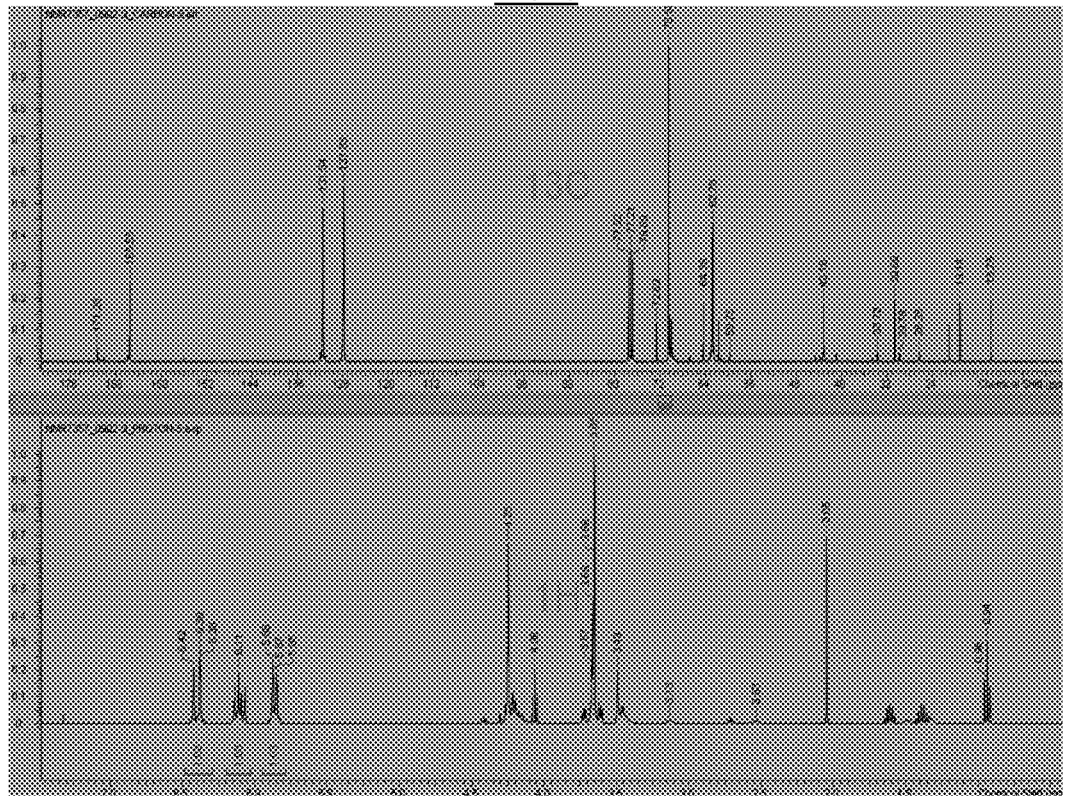

The GPC results showed the distribution of the prepared resin, as seen in FIG. 2. The IR spectra showed the functional groups of the prepared resin, as seen in FIG. 5; The NMR spectra showed $^1$H and $^{13}$C of the prepared resin, as shown in FIG. 8.

Example 3—Synthesis Process

IPDI (9.14 g) and dibutyl tin dilaurate (0.1 g) and BHT (0.1 g) were placed into a four-neck round bottom flask that equipped with an agitator and a condenser. Pentaerythritol acrylate (PETA) (20.97 g) was dropped into the mixture within 1 hour at 60° C. and the mixture was cooked at 60° C. for 1 hour. Then Perfluoropolyether diol (69.89 g) was dissolved in methyl isobutyl ketone (MiBK) and added to the mixture and heated to 80° C. The mixture was cooked at 80° C. for 1 hour to form the pre fluorinated oligomer.

HDI trimer in BAc (90%) (88.65 g) and dibutyl tin dilaurate (0.3 g) and BHT (0.3 g) were placed into a four-neck round bottom flask that was equipped with an agitator and a condenser. Pre fluorinated oligomer (0.86 g) was added to the mixture and heated to 60° C. The mixture was cooked at 60° C. for 1 hour. Then pentaerythritol acrylate (PETA) (211.32) was dropped into the mixture within 1 hour at 80° C. and the mixture was cooked at 90° C. for 1 hour or more until NCO group completely disappeared.

Figure 3:
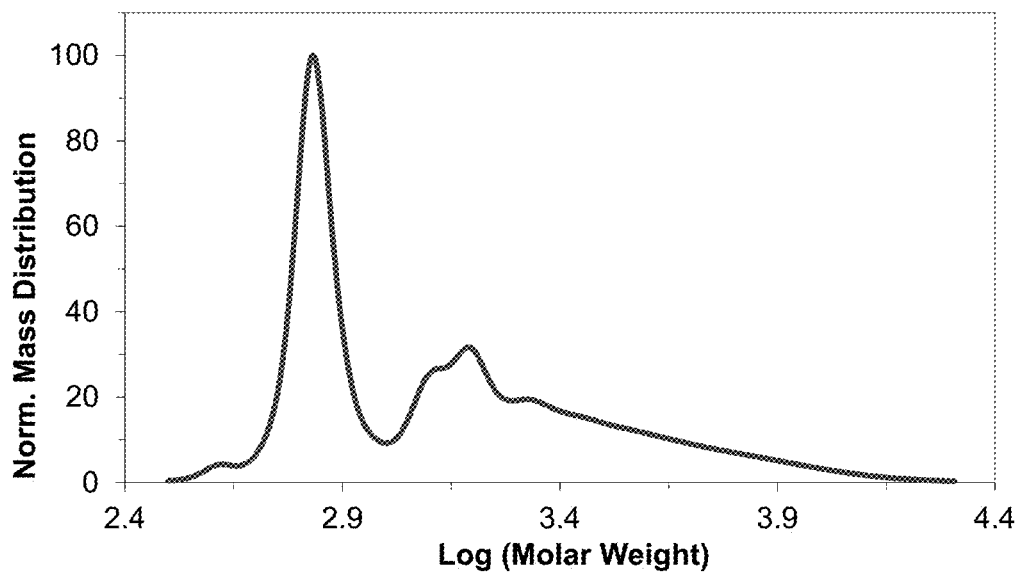
Figure 6:
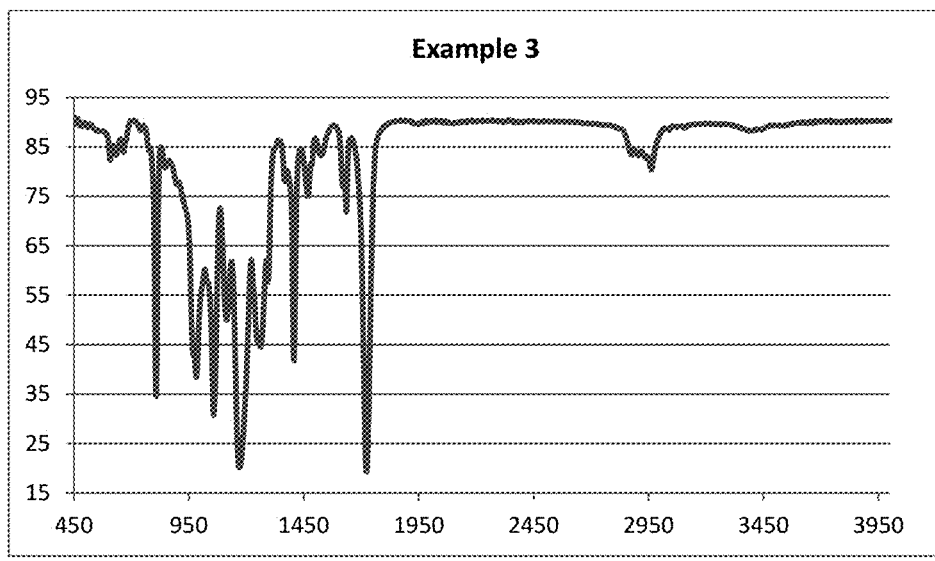
Figure 9:
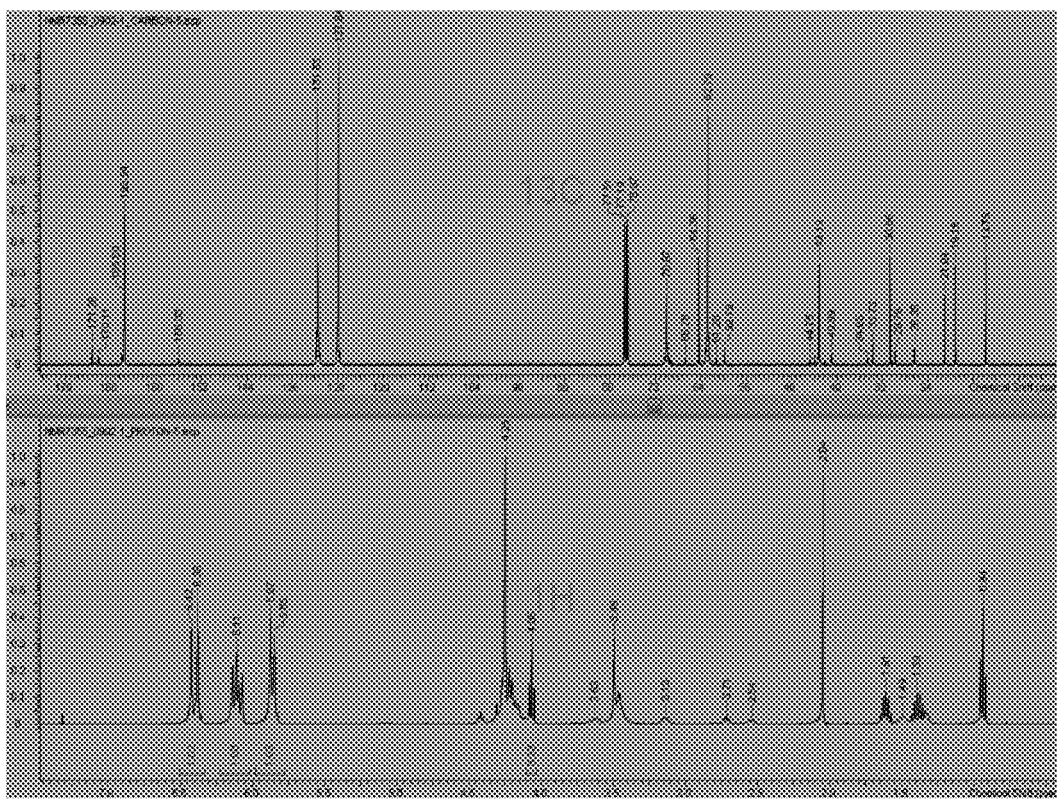

The GPC results showed the distribution of the prepared resin, as seen in FIG. 3. The IR spectra showed the functional groups of the prepared resin, as seen in FIG. 6; The NMR spectra showed $^1$H and $^{13}$C of the prepared resin, as shown in FIG. 9.

Example 4—Formation of Coatings

Samples of the resin composition prepared according to example 1 were cured singly and mixed with other resin to form the coating films.

Two samples of the resin prepared according to example 1 were diluted with a mixed solvent of methyl isobutyl ketone (MiBK) and butyl acetate (BAc), sprayed onto a PC/ABS substrate, and then cured by exposure to UV light and being heated to 120° C., respectively.

A sample of the resin prepared according to example 1 was mixed with another UV resin (EM2692 available from Eternal) in a weight ratio of 7:3, sprayed onto a PC/ABS substrate, and then cured by exposure to UV light.

The results showed that the composition of the embodiments herein was capable of being cured by either exposure to ultraviolet light or heating at a temperature above 120° C. The dual curing mechanism allows the composition of the embodiments herein to mix with different types of other resins, including thermosetting resins and UV curable resins.

Example 5—Liquid Contact Angle Test

Liquid contact angle tests were conducted for the fluorinated resins of the embodiments herein. The water and oil contact angles of coating film surface were measured with a commercially available apparatus named Dataphysics OCA20/6.

Two samples of coating-forming resins were prepared for comparison. One was a common UV resin (UX-8800WIBAC20, KAYAKU CHEMICAL(WUXI) CO., LTD), and the other one was the composition prepared according to example 1. Both of the samples were applied onto PC/ABS substrates and cured by exposure to ultraviolet light.

Water contact angle was measured on top of the cured coatings, respectively, with Sessile drop method. The droplets were set as 3 µl/droplet, and the measurement temperature was about 20° C. The test results are shown in the table 1 below.

n-Hexadecane contact angle was measured similarly with the same method. The droplets were set as 2 µl/droplet, and the measurement temperature was about 20° C. The test results are shown in the table 1 below as well.

TABLE 1

| the liquid contact angle of cured samples | | |
|---|---|---|
| Resin | Water contact angle | Hexadecane contact angle |
| UV resin | 64.4 | <10 |
| fluorinated resin | 110.5 | 68.7 |

Example 6—Oil-Based Ink Repellence and Anti-Scratch Performance Test

Oil-based ink repellence tests were conducted for the fluorinated polymers of the embodiments herein.

Two samples of coating-forming resins were prepared for comparison. One was a common UV resin (UX-8800WIBAC20, KAYAKU CHEMICAL(WUXI) CO., LTD), and the other one was the composition prepared according to example 1. Both of the samples were applied onto PC/ABS substrates and cured by exposure to ultraviolet light.

Figure 10:
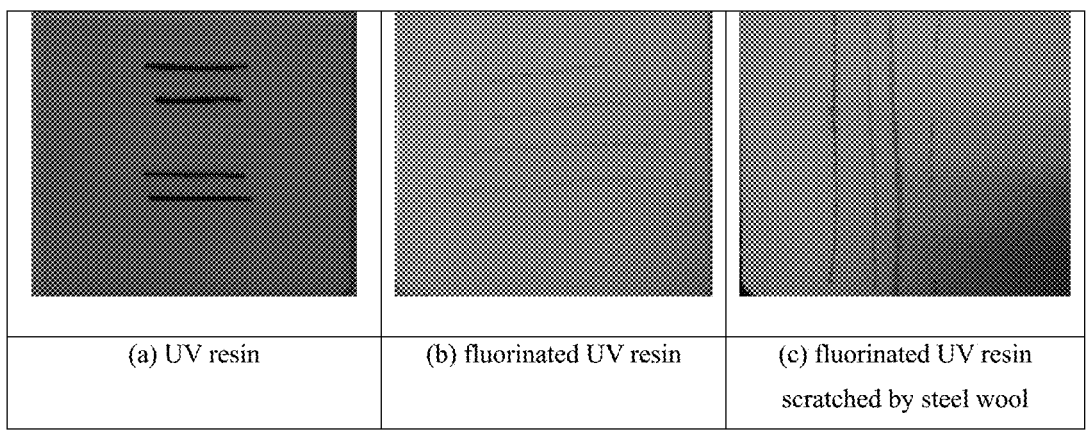
FIG. 10 shows the comparison of oil-based ink repellence on different UV resins.

Pens with different colors of oil-based inks were used to write and draw on top of the cured coatings, respectively. Pictures were taken to show the different appearance of the inks wrote onto the cured coatings, see (a) and (b) of FIG. 10. It was seen that the inks wrote on the cured coating of the common UV resin were well spread and shown as regular lines, and that the inks wrote on the cured coating of the composition prepared according to example 1 were barely spread, while instead, shrank into small liquid beads, indicating that the latter coating surface has strong repellence to the oil-based inks. The oil-based inks wrote on the cured coating formed with the composition prepared according to example 1 were easily wiped off, with substantially no stain remains (not shown in the picture).

Anti-scratch performance of the coatings was tested by scratching the coatings 500 cycles with steel wool under 1 Kg gram load. Upon test, the cured coating formed with the composition prepared according to example 1 still represented excellent oil-based ink repellence and without any visible scratch marks, as seen in (c) of FIG. 10.

The invention claimed is:

1. A coating composition comprising:
   (a) a polyacrylate oligomer of the following structure (I)

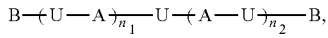

and
   (b) a fluorinated polyacrylate oligomer of the following structure (II)

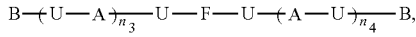

wherein,
   U originates from an isocyanate structure that had at least two —N=C=O functional groups;
   A originates from a diol or polyol structure selected from the group consisting of ethylene glycol, diethylene glycol, neopentyl glycol, 1,6-hexanediol, cyclohexanedimethanol, polyester diols, polycarbonate diols, polyether diols, polyethylene glycol 200 (PEG200), polyethylene glycol 400 (PEG400), polyethylene glycol 600 (PEG600), polypropylene glycol 1000 (PPG1000), and a mixture thereof; F originates from a fluorinated diol or polyol structure, or a perfluoropolyether structure that contained at least two hydroxyl groups, or a mixture thereof; B originates from a structure that had at least one double bond and at least one hydroxyl group; $n_1$, $n_2$, $n_3$ and $n_4$ are integers, the sum of $n_1$ and $n_2$ is ranging from 0 to 20, the sum of $n_3$ and $n_4$ is ranging from 1 to 20.

2. The coating composition according to claim 1, wherein the weight ratio between the oligomers (I) and (II) is from 90:10 to 10:90.

3. The coating composition according to claim 1, wherein U originates from a diisocyanate structure selected from the group consisting of 1,6-hexane diisocyanate, isophorone diisocyanate, 4,4'-diphenyl-methane-diisocyanate, 4,4'-dicyclohexylmethane diisocyanate, xylylene diisocyanate, tolylene-2,4-diisocyanate, and a mixture thereof.

4. The coating composition according to claim 1, wherein B originates from a hydroxyl (meth)acrylate structure that contains at least one (meth)acryloyl group and one hydroxyl group, selected from the group consisting of 2-hydroxyethyl (meth)acrylate, 2-hydroxypropyl(meth)acrylate, 2-hydroxybutyl(meth)acrylate, 1-hydroxybutyl(meth)acrylate, neopentylglycolmono(meth)acrylate, 1,6-hexanediolmono(meth)acrylate, polycaprolactone polyol mono(meth)acrylate, pentaerythritolpenta(meth)acrylate, dipentaerythritolpenta(meth)acrylate, and a mixture thereof.

5. The coating composition according to claim 1, wherein F is selected from structures originating from the group consisting of:
   2,2,3,3-tetrafluoro-1,4-butanediol;
   2,2,3,3,4,4,5,5-octafluoro-1,6-hexanediol;
   2,2,3,3,4,4,5,5,6,6,7,7-dodecafluoro-1,8-octanediol;
   2,2,3,3,4,4,5,5,6,6,7,7,8,8-tetradecafluoro-1,9-nonanediol;
   2,2,3,3,4,4,5,5,6,6,7,7,8,8,9,9-hexadecafluoro-1,10-decanediol; and
   1H,1H,12H,12H-Perfluoro-1,12-dodecanediol.

6. A method for preparing the coating composition according to claim 1, comprising steps of:
   a) preparing a solution of a fluorinated diol or polyol or a perfluoropolyether that contains at least two hydroxyl groups, or a mixture thereof in a solvent;
   b) dropping the solution of step a) into an isocyanate that has at least two isocyanate functional groups, forming a mixture which is heated to 50 to 60° C., and maintaining the temperature at 50 to 60° C. for 1 to 2 hours, to form a structure -U-F-U- to obtain a reaction mixture comprising structure -U-F-U-;
   c) adding a diol or polyol selected from the group consisting of ethylene glycol, diethylene glycol, neopentyl glycol, 1,6-hexanediol, cyclohexanedimethanol, polyester diols, polycarbonate diols, polyether diols, polyethylene glycol 200 (PEG200), polyethylene glycol 400 (PEG400), polyethylene glycol 600 (PEG600), polypropylene glycol 1000 (PPG1000), and a mixture thereof into the reaction mixture comprising structure -U-F-U- of step b), together with unreacted isocyanate, with maintaining the temperature at 50 to 60° C. for 1 to 2 hours, to form structures $-(U-A)_{n3}-U-F-U-(A-U)_{n4}-$ and $-(U-A)_{n1}-U-(A-U)_{n2}$ to obtain a reaction mixture comprising structures $-(U-A)_{n3}-U-F-U-(A-U)_{n4}-$ and $-(U-A)_{n1}-U-(A-U)_{n2}$;
   d) at a temperature of 80 to 90° C. adding a monomer that has at least one double bond and at least one hydroxyl group into the reaction mixture comprising structures $-(U-A)_{n3}-U-F-U-(A-U)_{n4}-$ and $-(U-A)_{n1}-U-(A-U)_{n2}-$ of step c), with maintaining the temperature at 80 to 90° C. for 1 to 2 hours to form structures $B-(U-A)_{n3}-U-F-U-(A-U)_{n4}-B$ (II) and $B-(U-A)n_1-U-(A-U)_{n2}-B$ (I).

7. A coating composition comprising:
   (a) a polyacrylate oligomer of the following structure (I)

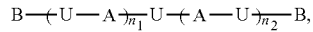

and
   (b) a fluorinated polyacrylate oligomer of the following structure (II)

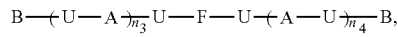

wherein,
   U originates from an isocyanate structure that had at least two —N=C=O functional groups;
   A originates from a diol or polyol structure;
   F is selected from structures originating from the group consisting of:
   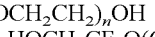
   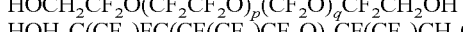
   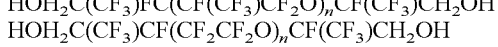
   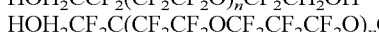
   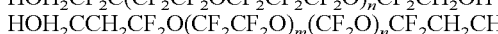
   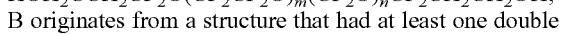
   B originates from a structure that had at least one double bond and at least one hydroxyl group; $n_1$, $n_2$, $n_3$ and $n_4$ are integers, the sum of $n_1$ and $n_2$ is ranging from 0 to 20, the sum of $n_3$ and $n_4$ is ranging from 1 to 20;
   wherein m is from 1 to 50, n is from 1 to 50, p is from 1 to 5, q is from 1 to 5.

8. The coating composition according to claim 7, wherein the weight ratio between the oligomers (I) and (II) is from 90:10 to 10:90.

9. The coating composition according to claim 7, wherein U originates from a diisocyanate structure selected from the group consisting of 1,6-hexane diisocyanate, isophorone diisocyanate, 4,4'-diphenyl-methane-diisocyanate, 4,4'-dicyclohexylmethane diisocyanate, xylylene diisocyanate, tolylene-2,4-diisocyanate, and a mixture thereof.

10. The coating composition according to claim 7, wherein B originates from a hydroxyl (meth)acrylate structure that contains at least one (meth)acryloyl group and one hydroxyl group, selected from the group consisting of 2-hydroxyethyl(meth)acrylate, 2-hydroxypropyl(meth)acrylate, 2-hydroxybutyl(meth)acrylate, 1-hydroxybutyl(meth)acrylate, neopentylglycolmono(meth)acrylate, 1,6-hexanediolmono(meth)acrylate, polycaprolactone polyol mono(meth)acrylate, pentaerythritolpenta(meth)acrylate, dipentaerythritolpenta(meth)acrylate, and a mixture thereof.

11. A method for preparing the coating composition according to claim 7, comprising steps of:

a) preparing a solution of a fluorinated diol or polyol, or a perfluoropolyether selected from the group consisting of:

$HO(CH_2CH_2O)_nCH_2CF_2O(CF_2CF_2O)_p(CF_2O)_qCF_2CH_2(OCH_2CH_2)_nOH$ $HOCH_2CF_2O(CF_2CF_2O)_p(CF_2O)_qCF_2CH_2OH$ $HOH_2C(CF_3)FC(CF(CF_3)CF_2O)_nCF(CF_3)CH_2OH$ $HOH_2C(CF_3)CF(CF_2CF_2O)_nCF(CF_3)CH_2OH$ $HOH_2CCF_2(CF_2CF_2O)_nCF_2CH_2OH$ $HOH_2CF_2C(CF_2CF_2OCF_2CF_2CF_2O)_nCF_2CH_2OH$ $HOH_2CCH_2CF_2O(CF_2CF_2O)_m(CF_2O)_nCF_2CH_2CH_2OH$, wherein m is from 1 to 50, n is from 1 to 50, p is from 1 to 5, and q is from 1 to 5, or a mixture thereof in a solvent;

b) dropping the solution of step a) into an isocyanate that has at least two isocyanate functional groups, forming a mixture which is heated to a temperature of 50 to 60° C., and maintaining the temperature at 50 to 60° C. for 1 to 2 hours, to form a structure -U-F-U-to obtain a reaction mixture comprising structure -U-F-U-;

c) adding a diol or polyol selected from the group consisting of ethylene glycol, diethylene glycol, neopentyl glycol, 1,6-hexanediol, cyclohexanedimethanol, polyester diols, polycarbonate diols, polyether diols, polyethylene glycol 200 (PEG200), polyethylene glycol 400 (PEG400), polyethylene glycol 600 (PEG600), polypropylene glycol 1000 (PPG1000), and a mixture thereof into the reaction mixture comprising structure -U-F-U-of step b), -U-F-U-, together with unreacted isocyanate, with maintaining the temperature at 50 to 60° C. for 1 to 2 hours, to form structures $-(U-A)_{n3}$-U-F-U-$(A-U)_{n4}$- and $-(U-A)_{n1}$-U-$(A-U)_{n2}$ to obtain a reaction mixture comprising structure $-(U-A)_{n3}$-U-F-U-$(A-U)_{n4}$- and $-(U-A)_{n1}$-U-$(A-U)_{n2}$;

d) at a temperature of 80 to 90° C. adding a monomer that has at least one double bond and at least one hydroxyl group into the reaction mixture comprising structures $-(U-A)_{n3}$-U-F-U-$(A-U)_{n4}$- and $-(U-A)_{n1}$-U-$(A-U)_{n2}$- of step c), with maintaining the temperature at 80 to 90° C. for 1 to 2 hours to form structures B-$(U-A)_{n3}$-U-F-U-$(A-U)_{n4}$-B (II) and B-$(U-A)_{n1}$-U-$(A-U)_{n2}$-B (I).

* * * * *